Patented Aug. 9, 1932

1,870,650

UNITED STATES PATENT OFFICE

GEORGE A. RICHTER, OF BERLIN, NEW HAMPSHIRE, ASSIGNOR TO BROWN COMPANY, OF BERLIN, NEW HAMPSHIRE, A CORPORATION OF MAINE

CHEMICAL MODIFICATION OF CELLULOSE FIBER

No Drawing.   Application filed September 6, 1930.   Serial No. 480,202.

This invention relates to the chemical modification of cellulose fibers of various types, its chief object being the production of a finished product of high alpha cellulose content eminently suitable for use as a raw material for papermaking and/or for conversion into cellulose derivatives.

The process of the present invention comprises, broadly, two steps: First, a treatment with a reagent to hydrolyze certain components, especially the pentosans, associated with the fiber; and, second, a treatment with a solution of alkali to dissolve products of hydrolysis and other non-alpha celluloses associated with the fiber. These two steps may be practised upon the fiber in combination with other treatments, depending on the origin of the fiber used as a raw material and the ultimate product which it is desired to produce. Fibers of various origins, including cotton or pulps derived from wood, bagasse, or the like, may be used as a raw material. The wood pulps employed may be unbleached sulphite, kraft, soda, or ground-wood, or such pulps in a bleached or in a refined bleached or unbleached condition. When cotton or refined wood pulp, which is of high alpha cellulose content to begin with, is used as raw material, the hydrolyzing treatment is carried out under conditions to effect a reduction of the so-called solution viscosity of the fiber. Inasmuch as such a hydrolyzing treatment may, in the case of a refined pulp, be accompanied by a reduction of the alpha cellulose content of the fiber by conversion into beta cellulose or oxycellulose, the subsequent alkaline treatment may serve to restore to the fiber its original alpha cellulose content, or even to increase its alpha cellulose content. If an unbleached pulp such as derived from wood is used as a raw material, the hydrolyzing treatment is preferably preceded by a treatment with agents which react upon and remove ligneous groups present in the raw pulp. Chlorine water, bleach liquor, and bisulphite solutions are examples of agents which are suitable for this purpose.

The hydrolyzing treatment lends itself to practice under a diversiy of conditions and with various agents. Thus, solutions or suspensions of both acid and alkaline agents, and even water alone, may be used, but the temperature of treatment to be applied when using most agents is 300° to 400° F., or even higher, although some agents, notably acid solutions, may be used at much lower temperatures, for instance at as low as 20° C., or even lower, if they are concentrated; but if they are dilute, the temperature may be boiling, under atmospheric or higher pressure. When water or dilute alkaline solutions or suspensions are employed, it is necessary that these be maintained at temperatures of about 300° to 400° F., to produce the desired hydrolyzing effect. The hydrolyzing solution or suspension may be one of salts which undergo hydrolysis in water to produce either an alkaline or acid condition therein. For example, solutions of salts such as zinc chloride, calcium chloride, alum, etc., may be used for the hydrolyzing treatment of the fiber, in which case the solution need not be heated to temperatures much above 212° F., but if solutions of salts such as sodium sulphite, borax, etc., which undergo slight alkaline hydrolysis, are employed, the temperature of treatment should be from about 350° to 425° F. The hydrolyzing treatment may follow a treatment of the fiber with an agent which reacts upon the ligneous groups associated therewith, with or without washing of the agent from the fiber. For example, if a bisulphite solution is used to react upon the ligneous groups present in a raw pulp, the free sulphurous acid which may be expelled from the solution by heat may, if desired, be so removed, whereupon the solution may be heated to a temperature sufficiently elevated to bring about the desired hydrolysis. In lieu of expelling the sulphurous acid from the solution under the application of heat, a suitable base may be added thereto to neutralize in part or in whole residual sulphurous acid present in the solution, whereupon the solution may be heated to a temperature at which the desired hydrolysis will ensue.

The hydrolyzing treatment may affect the fiber in one or two ways, depending upon the conditions under which it is carried out, as will hereinafter be illustrated by specific examples. It is accompanied by the removal of pentosans or their transformation into products which are readily soluble in alkaline liquors. It may, however, also be accompanied by a lowering of the solution viscosity of the fiber to values whereat it constitutes an excellent raw material for conversion into cellulose xanthate, cellulose nitrate, and other derivatives which are to be used as solutions of low viscosity in the production of such products as artificial silk, films, lacquers, and the like. The hydrolysis of the pentosans makes possible an easy attainment of a product of high alpha cellulose content when the fiber is subsequently treated with alkaline liquors at temperatures which need not exceed 212° F. Ordinarily pulps, especially those of high pentosan content such as kraft or soda, resist transformation into a product of high alpha cellulose content, by treatment in alkaline liquors under conditions which are economically obtained in practice. For example, it is exceedingly difficult to increase the alpha cellulose content of kraft pulp to 94% to 98% by digestion in comparatively weak alkaline solutions at boiling temperature. This difficulty is traceable to the high pentosan content of the kraft pulp, which usually amounts to 6% to 9% in the usual commercial product. Even when comparatively strong alkaline solutions are used for the refinement of a kraft pulp, it is difficult to produce a product having an alpha cellulose content of more than 94% unless the solution is so concentrated as to mercerize the fiber, in which case the fiber loses certain desirable papermaking characteristics, which loss is undesirable when the product is to be used for papermaking. The hydrolyzing treatments of the present invention make possible the refinement of the pulp to high alpha cellulose content in alkaline liquors which may be of such strength as not to mercerize the fiber and thus to preserve its papermaking characteristics. While such a hydrolyzing treatment may be practised to great advantage on pulps which are high in pentosans, such as kraft, soda, hardwood sulphite, and pulps derived from bagasse and grasses, it may also be applied to advantage in the treatment of pulp produced by the usual bisulphate or other acid pulping process. The pentosans associated with the usual sulphite pulp are more easily removable by treatment with alkaline liquors than the pentosans present in pulps such as kraft or soda, as the bisulphite liquor acts not only to delignify the wood, but also as a hydrolyzing agent. It is, however, difficult to control a sulphite cooking operation to produce a product having both the desired papermaking characteristics and a product of very low pentosan content, as the modification of the cook to bring about a lowering of pentosans in the resulting pulp might give rise to injury of the physical or papermaking characteristics of the product. By subjecting the already liberated sulphite pulp, however, to a hydrolyzing treatment such as hereinbefore described, it is possible to preserve the previously attained papermaking characteristics and at the same time to reduce materially the pentosans which have survived the acid sulphite cooking operation.

When a pulp of high pentosan content, such as kraft, is used as a raw material, I prefer to carry out the hydrolyzing treatment in a sodium sulphite solution, which not only removes pentosans but also residual lignin associated with the pulp. For example, I have found that if kraft pulp is digested for two to four hours in a 1% sodium sulphite solution, at a temperature of 360° to 400° F., a marked reduction in pentosans and a considerable removal of lignin associated with the pulp is effected. A similar desirable result is brought about by the use of weak sodium sulphide solutions or suspensions of magnesium carbonate at temperatures of between 360° to 400° F. Where sulphite pulps are used as raw material the hydrolyzing treatment may be advantageously carried out with water alone, at temperatures of between 300° to 400° F., at which temperature the desired hydrolysis is completed in from two to six hours. A sulphite pulp yields to such water treatment at a lower temperature and in a shorter period of time than a kraft pulp, evidently because the pentosans have been modified by previous acid sulphite digestion, so that they are more readily attacked by water than the pentosans associated with an alkaline-liberated pulp, such as kraft. Hydrolyzing treatments in acid solutions are less desirable, in that they tend to impair the papermaking characteristics of the fiber, but they may be employed, especially when the finished product is to serve as a raw material for the preparation of cellulose derivatives. In such case, the pulp may be treated with relatively strong cold mineral acid, for instance a 15% sulphuric acid solution at, say, 120° F., for two to three hours. Or, if desired, such treatment may be effected in solutions of salts which undergo acid hydrolysis, for example, in a 15% to 30% solution of zinc chloride at 40° to 80° C., for two to four hours. Such acid hydrolyzing treatments have little effect on the residual lignin present in the pulp, but they are highly effective upon pentosans and tend to lower the solution viscosity of the pulp markedly.

The hydrolyzed fiber is treated with solutions of alkali of a strength and under temperature conditions designed to dissolve alkali-soluble products of hydrolysis, such as hydrocellulose or decomposed pentosan groups. Solutions of caustic soda of mercerizing strength are highly suitable for this purpose, but inasmuch as they destroy the papermaking characteristics of the fiber and more particularly its capacity for being hydrated or gelatinized when beaten, they are useful more particularly when the resulting product is to serve as a raw material for making cellulose derivatives. When the papermaking characteristics of the fiber are to be preserved, the treatment may be accomplished with alkaline solutions at elevated temperatures, but such solutions are stronger than the very weak alkaline solutions employed for hydrolyzing the fiber and may be used at lower temperatures. For instance, I may treat the hydrolyzed fiber with a 1% caustic soda solution at 100° to 150° C. for two to four hours. Or I may use stronger solutions of alkali at lower temperatures, for instance, a 5% caustic soda solution at from 30° to 60° C. for one to two hours. If the hydrolysis is carried out in the presence of alkali, I may simply add additional alkali to the mass of hydrolyzed pulp and allow the suspension to cool to the temperature desired for alkaline purification. Alkalies other than caustic soda, for instance, lime, may be used in preparing the alkaline refining liquor. For example, the hydrolyzed fiber may be digested in a suspension of 5% to 10% lime, based on pulp, at a temperature of 100° C. for two to four hours. While not as potent a refining chemical as caustic soda, lime possesses the advantage of comparative cheapness.

When the hydrolyzed fiber is to be treated with a mercerizing liquor, the treatment may be carried out with an 18% caustic soda solution at room temperature. Or an equivalent result may be accomplished by the use of weaker caustic soda solutions at below room temperature, for instance, solutions of 8% or less caustic soda concentration, at from 0 to −20° C. If desired, the mercerizing liquor may contain oxidizing agents, such as sodium hypochlorite or sodium permanganate, in which case such agents tend to remove ligneous and other coloring matter in the pulp, and thus to produce a light-colored product. On the other hand, the mercerizing liquor may contain reducing agents rather than oxidizing agents, such as sodium sulphide or sodium sulphite, which inhibit the formation of oxycelluloses. The treatment with a mercerizing liquor may be as short as from ten to twenty minutes, but if a product of low solution viscosity is desired, the treatment may be from one to two hours. If a product of extremely low solution viscosity is desired, the mercerized fiber may be aged in the presence of alkali, as is the practice in the viscose industry. Thus, the mass of pulp associated with mercerizing liquor may be thickened, squeezed free of excess liquor, ground to a fluffy condition, and the fluffed mass exposed to the atmosphere for from 24 to 72 hours. The aged fiber may then be washed free of residual alkali. The aged product is not only of an alpha cellulose content higher than that present in the soda celluloses customarily prepared in the viscose industry, but is characterized by a solution viscosity of from 0.5 to 0.1, which values are even lower than the solution viscosity values of the aged soda cellulose made from ordinary pulps such as are customarily used in the viscose industry.

The alkaline purified stock either in mercerized or unmercerized condition, is preferably subjected to a final bleaching in order to reach a pure white product, but, inasmuch as the previous treatments have removed ligneous and other coloring matter, this bleaching operation requires but a small amount of oxidizing agent, such as hypochlorite, and accordingly little degradation of the pulp into oxycelluloses takes place during the bleaching operation, particularly when the bleach liquor contains a small amount of alkali, which maintains a condition of alkalinity throughout such bleaching operation.

I shall now give examples embodying the principles of the present invention, in which a pulp of high pentosan content, such as kraft or soda, may be employed as raw material. The raw pulp is preferably first treated with from 3% to 6% chlorine, based on pulp at 20° C. for two to four hours. After washing, the pulp is digested in a 1% sodium sulphite solution at 360° to 375° F. for from two to six hours, at the end of which time the pulp is washed. The washed product has approximately one-third the lignin content of the original pulp. It is lower in pentosans and such pentosans as remain are much more susceptible to solution in alkaline reagents than those present in the original pulp. The washed pulp is then treated with an 8% caustic soda solution at 15° to 20° C. for a period of from two to four hours, whereupon the pulp is again washed. The resulting product has good papermaking characteristics, its alpha cellulose content is in the vicinity of 96%, and its pentosan content is as low as 1% to 2%. If desired, it may be bleached to enhance whiteness and cleanliness.

In lieu of using a sodium sulphite solution in hydrolyzing the fiber, the fiber may be treated with a 0.5% sodium sulphide solution at 360° F. for two to six hours. Before treating with a caustic soda solution as in the example, the pulp may be treated with a bleach liquor containing, say, 5% hypochlorite bleach, based on pulp, whereupon it may be processed as in the example. Such an intermediate bleaching treatment not only lessens the amount of bleach required in the final bleaching operation, but is advantageous in that oxycelluloses produced in the pulp are removed during the subsequent treatment with alkaline purifying solution. Or, if desired, the hydrolyzing treatment may be carried out in water at, say, 300° to 325° F. for four hours. It is preferable that the water contain in suspension small quantities of relatively insoluble basic material, such as pulverulent calcium carbonate or magnesium sulphite, so that acidic products generated during hydrolysis will be progressively neutralized by the basic material so as not to degrade the fiber.

In producing a finished product especially suitable for making cellulose derivatives, a raw sulphite pulp may be treated as follows. The pulp is preferably initially treated with about 3% chlorine, based on pulp, at 20° C. for about two hours. It is then washed and hydrolyzed in a 0.1% solution of caustic soda or sodium sulphide at 350° to 400° F. for two to four hours. The hydrolyzed stock is then treated with 10% caustic soda, based on pulp as a 6% to 8% stock suspension at 100° C. for six hours. At the end of this treatment, the stock is washed. It has an alpha cellulose content of more than 94%, a pentosan content of from 0.5 to 1.5%, and a viscosity of 0.5 to 2.0. This product may be treated with a comparatively small amount of bleach or permanganate to reach best color.

The alkaline purifying solution in the example may be used at lower temperature, if it is of sufficient causticity. For instance, I may use a 6% caustic soda solution at 20° C. for two to six hours, or at somewhat higher temperatures, say, 40° or 50° C. The resulting product has characteristics analogous to those obtained when alkaline refinement has been effected in a hot alkaline liquor. Or the treatment may be effected in an alkaline solution to mercerize the fiber, for instance, to an 18% caustic soda solution at 20° C. Aside from mercerizing the fiber, the liquor refines the pulp to an alpha cellulose content of 96% or higher, and reduces its solution viscosity to a value of about 0.5 to 1.5. The mercerized product may be bleached to pure whiteness with a small amount of permanganate, hypochlorite, or equivalent oxidants.

A pulp in raw or partly refined condition may be hydrolyzed with a 0.02% hydrochloric acid solution at 100° C. for two to six hours. The hydrolyzed fiber may then be partially bleached with, say, from 3% to 5% bleach, based on pulp, and then washed. It may be finally treated with an 18% caustic soda solution at 20° C. to produce a product having an alpha cellulose content of 96% or above, and a solution viscosity of about 0.5 or lower.

The foregoing examples are merely illustrative of a large number of procedures falling within the purview of the present invention, although, as has already been indicated, some procedures may, in certain instances, be preferable to others. For instance, when the finished product is to be used exclusively for the making of derivatives such as nitrocelluloses, the alkaline purifying solution may advantageously be one which mercerizes, for the reason that a mercerized pulp is an excellent raw material for nitration. Such a mercerizing treatment may be coupled to advantage with a previous hydrolyzing treatment with an acid reagent, particularly when nitrocelluloses of the ½-second variety or of lower solution viscosity are desired, as such a combination of treatments is especially effective in bringing about a reduction in the solution viscosity of the fiber.

I claim:

1. A process which comprises subjecting cellulose pulp to the action of reagents at 300° to 400° F. to hydrolyze certain of its components, and then treating the pulp with an alkaline reagent to dissolve products of hydrolysis and other non-alpha celluloses associated with the pulp.

2. A process which comprises treating cellulose pulp with a weakly alkaline reagent at 300° to 400° F. to hydrolyze certain of its components, and then treating the pulp with a stronger solution of alkali at lower temperature to dissolve products of hydrolysis and other non-alpha celluloses associated with the pulp.

3. A process which comprises digesting cellulose pulp in water at 300° to 400° F. to hydrolyze certain of its components, and then treating the pulp with an alkaline reagent to dissolve products of hydrolysis and other non-alpha celluloses associated with the pulp.

4. A process which comprises digesting cellulose pulp in water containing relatively insoluble basic material in suspension and at sufficiently elevated temperature to hydrolyze certain components of the pulp, and then treating the pulp with an alkaline reagent to dissolve products of hydrolysis and other non-alpha celluloses associated with the pulp.

5. A process which comprises treating an unbleached wood pulp with chlorine water, subjecting the chlorinated pulp to the action of reagents at 300° to 400° F. to hydrolyze certain of its components, and then treating the pulp with an alkaline reagent to dissolve products of hydrolysis and other non-alpha celluloses associated with the pulp.

6. A process which comprises treating kraft pulp with chlorine water, digesting the chlorinated pulp in a solution of sodium sulphite at a temperature of 300° to 400° F. to hydrolyze certain of its components, and then treating the pulp with an alkaline reagent to dissolve products of hydrolysis and other non-alpha celluloses associated with the pulp.

7. A process which comprises treating an unbleached wood pulp with chlorine water, subjecting the chlorinated pulp to the action of reagents to hydrolyze certain of its components, treating the pulp with an alkaline reagent to dissolve products of hydrolysis and other non-alpha celluloses associated with the pulp, and finally bleaching.

8. A process which comprises treating raw pulp with a bisulphite solution to react upon ligneous groups present in the pulp, removing the free sulphurous acid from the solution, digesting the pulp in the resulting sulphite solution at temperatures of from 300° to 400° F. to hydrolyze certain of its components, and then treating the pulp with an alkaline reagent to dissolve products of hydrolysis and other non-alpha celluloses associated with the pulp.

9. A process which comprises treating raw cellulose pulp with a bisulphite solution, neutralizing free sulphurous acid present therein, digesting the pulp in the resulting sulphite solution at temperatures of from 300° to 400° F. to hydrolyze certain of its components, and then treating the pulp with an alkaline reagent to dissolve products of hydrolysis and other non-alpha celluloses associated with the pulp.

10. A process which comprises subjecting cellulose pulp to the action of reagents at 300° to 400° F. to hydrolyze certain of its components, and then treating the pulp with a mercerizing liquor to dissolve products of hydrolysis and other non-alpha celluloses associated with the pulp as well as to mercerize it.

11. A process which comprises subjecting cellulose pulp to the action of reagents at a temperature of at least about 300° F. to hydrolyze certain of its components, treating the pulp with a mercerizing liquor to dissolve products of hydrolysis and other non-alpha celluloses associated with the pulp as well as to mercerize it, ageing the mercerized pulp in the presence of alkali to lower its solution viscosity, and finally washing the aged product free of alkali.

12. A process which comprises subjecting a raw unbleached pulp to the action of reagents to hydrolyze certain of its components, bleaching the hydrolyzed pulp, and then treating the bleached pulp with an alkaline reagent to dissolve products of hydrolysis and other non-alpha celluloses associated with the pulp.

13. A process which comprises treating a raw pulp with chlorine water, subjecting the chlorinated pulp to the action of reagents to hydrolyze certain of its components, bleaching the hydrolyzed pulp, and then treating the bleached pulp with an alkaline reagent to dissolve products of hydrolysis and other non-alpha celluloses associated with the pulp.

14. A process which comprises subjecting cellulose pulp of the character of pre-liberated wood pulp to the action of aqueous reagents at a temperature of at least about 300° F. to hydrolyze certain of its components, and then treating the pulp with an alkaline reagent to dissolve products of hydrolysis and other non-alpha celluloses associated with the pulp.

In testimony whereof I have affixed my signature.

GEORGE A. RICHTER.